(12) United States Patent
Wernig et al.

(10) Patent No.: US 8,567,077 B2
(45) Date of Patent: Oct. 29, 2013

(54) LASER TRACKER SYSTEM AND TECHNIQUE FOR ANTENNA BORESIGHT ALIGNMENT

(75) Inventors: Michael C. Wernig, Delta, PA (US);
David J. Irwin, Sparks, MD (US);
Joseph H. Acoraci, Phoenix, MD (US);
Carol Acoraci, legal representative, Timonium, MD (US)

(73) Assignee: Raytheon Company, Waltham, MA (US)

(*) Notice: Subject to any disclaimer, the term of this patent is extended or adjusted under 35 U.S.C. 154(b) by 159 days.

(21) Appl. No.: 13/277,604

(22) Filed: Oct. 20, 2011

(65) Prior Publication Data
US 2013/0097880 A1 Apr. 25, 2013

(51) Int. Cl.
*G01B 11/27* (2006.01)
*G01B 7/31* (2006.01)

(52) U.S. Cl.
USPC ........................................ 33/286; 33/DIG. 21

(58) Field of Classification Search
USPC .............................. 33/286, 613, 645, DIG. 21
See application file for complete search history.

(56) References Cited

U.S. PATENT DOCUMENTS

| | | | | |
|---|---|---|---|---|
| 4,483,080 A * | 11/1984 | Knoll | | 33/286 |
| 6,484,381 B2 * | 11/2002 | Cunningham et al. | | 33/286 |
| 6,763,597 B2 * | 7/2004 | Lysen | | 33/286 |
| 2007/0107240 A1 * | 5/2007 | Piekutowski | | 33/286 |
| 2008/0012751 A1 * | 1/2008 | Owens et al. | | 342/62 |
| 2010/0188304 A1 * | 7/2010 | Clymer et al. | | 343/753 |
| 2010/0256841 A1 * | 10/2010 | Garrec et al. | | 701/17 |
| 2013/0074352 A1 * | 3/2013 | Bascom et al. | | 33/286 |

OTHER PUBLICATIONS

Zumwalt Class Destroyer; from Wikipedia; http://en.wikipedia.org/wiki/Zumwalt_class_destroyer; downloaded on Nov. 9, 2010 pp. 1-13.

* cited by examiner

*Primary Examiner* — G. Bradley Bennett
(74) *Attorney, Agent, or Firm* — Daly, Crowley, Mofford & Durkee, LLP

(57) ABSTRACT

A system and processes for aligning an antenna boresight from a position which is internal to a structure on which the antenna is mounted is described. The system includes a laser tracking system and a plurality of targets disposed on a surface of the antenna.

23 Claims, 9 Drawing Sheets

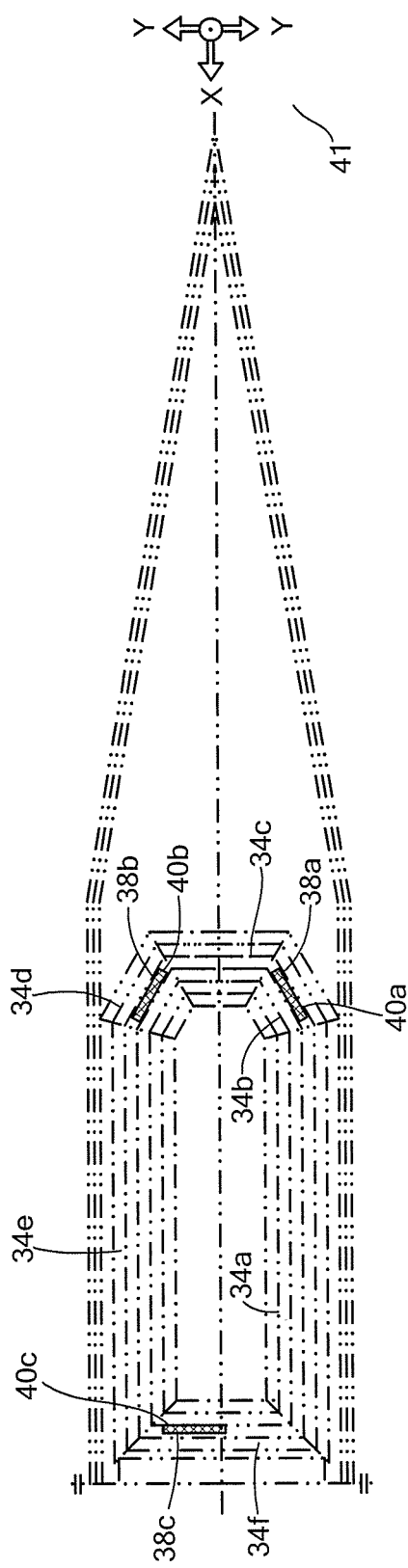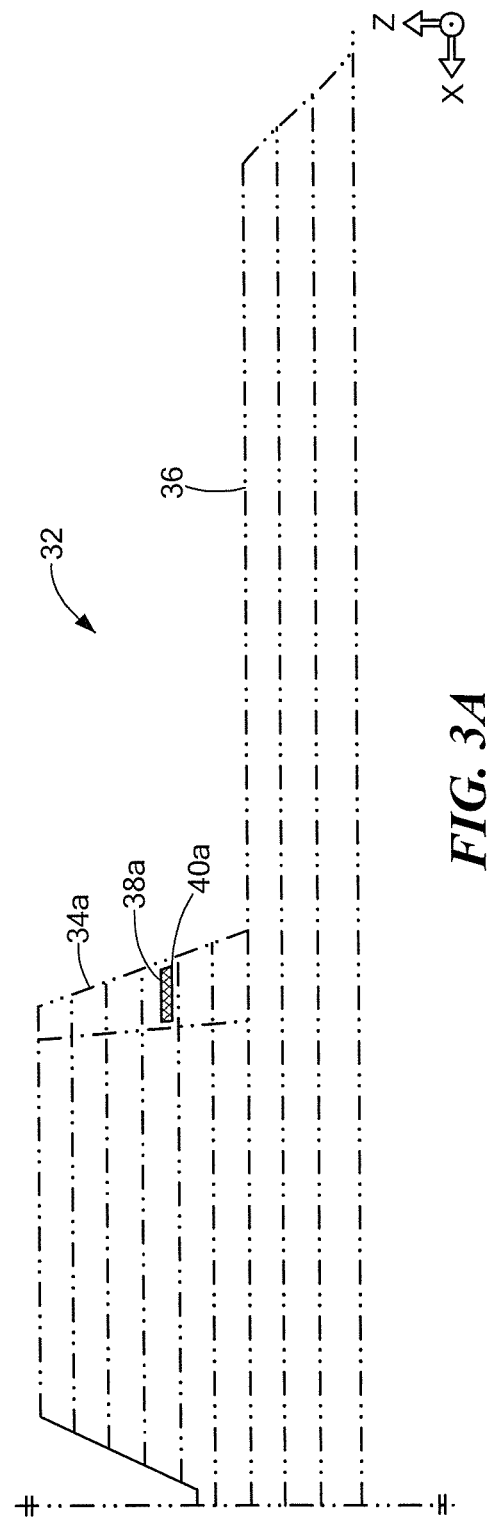
FIG. 3
FIG. 3A

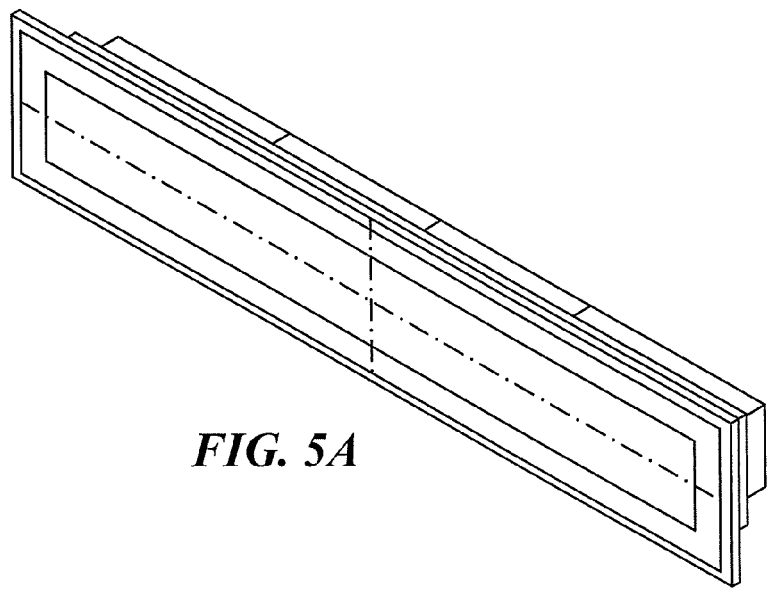
*FIG. 5A*
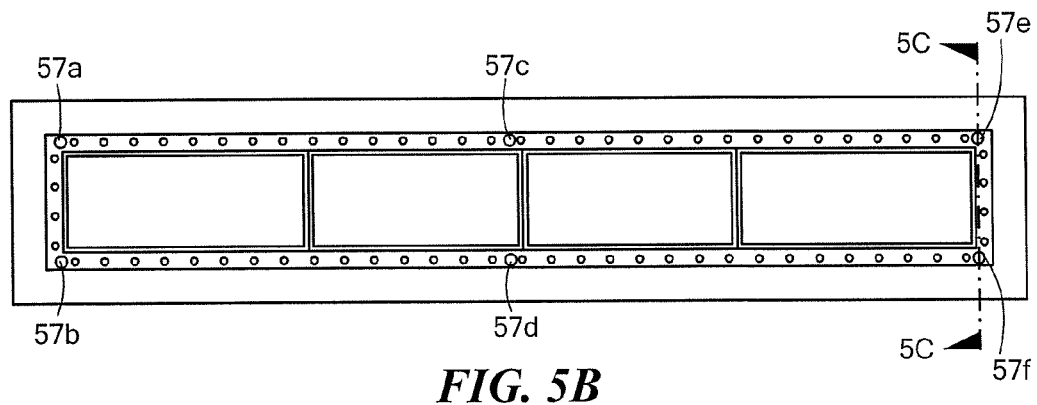
*FIG. 5B*
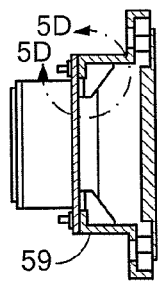 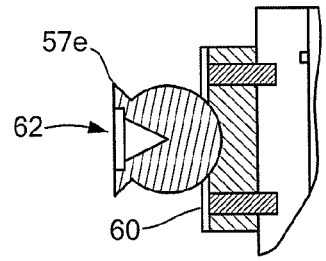
*FIG. 5C*  *FIG. 5D*

LASER TRACKER SYSTEM AND TECHNIQUE FOR ANTENNA BORESIGHT ALIGNMENT

GOVERNMENT RIGHTS

This invention was made with government support under Contract No. N00024-05-C-5346, awarded by the Department of the Navy. The government has certain rights in this invention.

CROSS REFERENCE TO RELATED APPLICATIONS

Not applicable.

FIELD OF THE INVENTION

The concepts, systems and techniques described herein relate generally to alignment techniques and more particularly to a method and apparatus for aligning a coordinate system of an antenna with a coordinate system of a platform on which the antenna is mounted.

BACKGROUND OF THE INVENTION

As is known in the art, modern ships often have antenna mounted on a deckhouse. The antenna boresight of ship-mounted antenna needs to be accurately aligned to the ship's Master Reference Coordinate System (MRCS). Antenna boresight alignment has traditionally been done from the ship exterior using optical targets and a theodolite.

SUMMARY OF THE INVENTION

In accordance with the present concepts, systems and techniques described herein. It has been recognized that some ship-mounted antenna do not lend themselves to antenna boresight using conventional alignment techniques using targets outside (i.e. exterior to) the deckhouse. Ships in the so-called Zumwalt class of guided missile destroyers, for example, have a shape and materials which make access to perform exterior alignment very difficult. Past efforts to perform antenna boresight alignment of an identification, friend or for (IFF) antenna on Zumwalt class ships attempted to measure a radome face from the exterior of the ship's deckhouse using optical targets and a theodolite. This process was not practical due to lack of access to the IFF radome face and radar absorbing material which covers the deckhouse. Thus, Zumwalt class ships have a requirement to perform antenna boresight alignment from inside the deckhouse since conventional alignment techniques using targets outside the deckhouse cannot be used for the Zumwalt ship/antenna configuration.

In view of the above-noted problems, it has been recognized that there exists a need for a reliable and repeatable technique to perform antenna boresight alignment from a location which is internal to a structure on which an antenna is mounted.

In accordance with the present concepts, systems and techniques described herein, a system for aligning an antenna disposed through a wall of a deckhouse of a ship includes a laser tracker system adapted to be mounted in an interior region of the deckhouse and configured to emit one or more laser beams and three (3) or more reference targets, each of the reference targets adapted to be coupled to a corresponding number of different reference positions of the antenna. Each of the reference targets are disposed in a position which yields measurement points that represent a plane needed for alignment the antenna to first and second orthogonal ship planes. With this particular arrangement, a system for aligning an antenna coordinate system with a ship coordinate system is provided.

In typical embodiments three (3) or more targets can be used. In a preferred embodiment, six (6) reference targets are used to establish a common reference plane that can be measured from an interior space of the structure on which the antenna is mounted. A minimum of 3 targets are required, but if 4 or more targets are available, then system uses a best fit approach to finding a desired plane. Having 6 targets provides some flexibility in gaining a clean line of site to at least 3 targets. If the reference targets are permanently mounted, they may also be used for initial antenna alignment as well as for maintenance alignment checks.

Use of reference targets for alignment measurement using a laser tracker results in a faster laser tracker measurement process which is relatively easy to perform compared with traditional theodolite techniques for antenna alignment.

In one embodiment, the laser tracker uses a single beam which rotates to each target. In other embodiments, a laser tracker which provides multiple beams may be used.

In one embodiment, the structure on which the antenna is mounted is a deckhouse of a ship and the laser tracker is positioned at the rear of the antenna to obtain measurements required to perform a shipboard antenna boresight alignment.

In one exemplary embodiment, the antenna is an identification friend or foe (IFF) electronically steered array (ESA) mounted on a deckhouse of a ship. The IFF ESA is provided having reference targets (or alignment features) embedded therein which allows an antenna boresight alignment to be performed from the interior of the deckhouse. In one embodiment, the interior alignment technique uses six reference targets that are permanently mounted to a frame backplate of an IFF ESA. In one embodiment, the targets include a magnetic base to support a spherically mounted reflector that is measured using a laser tracker which is positioned in the deckhouse interior. Measurement data required to establish antenna boresight alignment includes: (a) measured antenna boresight beam position with respect to antenna coordinate system (CSY) and antenna mechanical reference planes (AMRPs); and (b) measured antenna CSY and AMRP with respect to ship master coordinate system (MCSY) and reference planes.

In one embodiment, one of the alignment measurement requirements is to make precision measurement over long distances (e.g. greater than 100 ft) without a direct line of sight and to make precision measurements of planes and angles of large structures. The laser tracker alignment technique described herein solves this problem Features of the laser tracker include, but are not limited to: (a) a worst case horizontal measurement accuracy of about 40 meters±0.156 mm (b) portability; (c) 80 meter diameter measurement range; (d) laser tracker includes an integrated weather station which monitors and compensates for environmental factors (e.g. temperature, air pressure and humidity); (e) moveable and versatile mounting structures which allow measuring in tight and congested areas; (f) integrated precision level (accuracy ±2 arc seconds); (g) ability to capture real time dynamic measurements; (h) ability to capture and process measurement data using a processor (e.g. a PC) and CAM2 or other software (i.e. software supplied with the laser tracker which converts the distance and angles measured by the laser tracker to three-dimensional (3D) points which can be displayed with respect to a coordinate system; the software also functions to measure different part features like points, planes, circles etc).

The laser tracker replaces theodolites, laser range finders, articulated-arm coordinate measurement machines (CMMs) and photogrammetry systems used in prior art antenna boresight alignment techniques.

As will described more fully below, the antenna alignment process includes: (a) measuring antenna mechanical reference planes (AMRP) using a laser tracker and three or more reference targets mounted on the antenna; and (b) measuring AMRP with respect to antenna boresight beam position. It should be noted that reference target locations are selected such that they can be used for both antenna range and shipboard alignment. Thus, the laser alignment technique described herein may be used both in an interior location (e.g. inside a deckhouse of a ship) and in an exterior location (e.g. on an outdoor antenna range).

In accordance with a further aspect of the concepts, systems and techniques described herein, a method for aligning a mechanical reference plane of an antenna to a master coordinate system of a ship on which the antenna is mounted includes (a) establishing benchmarks and at least two reference planes on the ships; (b) mounting the antenna on a mounting structure of the ship; (c) positioning a laser tracker to measure antenna mechanical reference planes (MRPs); (d) measuring antenna MRPs; (e) comparing measured antenna MRP orientations or antenna boresight beam position to a desired orientation and determining an adjustment value; and (f) in response to the adjusting the antenna or antenna boresight beam to a desired orientation.

In one embodiment, positioning a laser tracker comprises positioning a laser tracker with a clear line of sight such that the laser tracker can point a laser beam at three or more reference targets coupled to the antenna.

In one embodiment, measuring antenna MRPs comprises emitting a laser beam at two or more different reference targets to establish a plane.

In one embodiment, prior to mounting the antenna on the ship, the method further comprises measuring the antenna MRP with respect to antenna boresight beam position.

In one embodiment, measuring the antenna MRP with respect to antenna boresight position comprises using a laser tracker to measure antenna MRP with respect to antenna boresight position.

In one embodiment, adjusting the antenna boresight beam comprises electronically adjusting the antenna boresight beam via a beam steering controller.

In one embodiment, positioning the laser tracker comprises positioning the laser tracker such that laser beams point with a clear line of site to at least three different reference targets.

With respect to measuring antenna mechanical reference planes, a minimum of 3 targets are required, but if 4 or more targets are available, then the system uses a best fit approach to finding a desired plane. The reference targets may be permanently mounted and thus used for initial antenna alignment as well as for maintenance alignment checks. In typical embodiments three (3) or more targets can be used. In a preferred embodiment, six reference targets are used to establish a common reference plane that can be measured from an interior space of the structure on which the antenna is mounted. Having 6 targets provides some flexibility in gaining a clean line of site to at least 3 targets.

With respect to measuring antenna MRP, the antenna boresight to antenna MRP alignment technique includes: (a) aligning a laser sight beam perpendicular to the antenna MRP; (b) positioning the antenna while the laser sight beam is centered on the reference antenna optical target (RAOT); (c) measuring antenna MRP orientation with the laser tracker; (d) rotating the antenna in azimuth such that the boresight beam is centered on the reference antenna center; (e) measuring the delta angle of MRP orientation with the laser tracker; and (f) electrically offsetting the antenna boresight beam normal to MRP per the measured delta angle.

A shipboard MCSY to antenna MRP alignment is next described. The shipboard MCSY to antenna MRP alignment process includes the unordered steps of: (a) creating benchmarks and reference planes throughout a ship's hull and deckhouse referenced to the MCSY; (b) bolting the antenna to be aligned (e.g. an IFF antenna) to a mounting structure (e.g. a deckhouse foundation); and (c) measuring antenna MRP orientation with respect to local interior deckhouse benchmarks to MCSY using a laser tracker. The MRP measurement data provides train, elevation and cross roll deviation magnitude from nominal values (DX, DY, DZ measurements can be taken if required, but are not required for the exemplary IFF ESA alignment technique described herein). The measured data that exceeds antenna system tolerances (e.g. IFF system tolerances) is used for adaptation data to offset antenna boresight beam position to meet a system tolerance value.

The Interior alignment technique described herein can be used for initial antenna alignments and also for maintenance antenna alignments throughout the life of the antenna and/or platform (e.g. ship) on which the antenna is disposed.

The laser tracker alignment technique described herein is fast, simple and provides repeatable accurate data.

BRIEF DESCRIPTION OF THE DRAWINGS

The foregoing features of the circuits and techniques described herein, may be more fully understood from the following description of the drawings in which:

FIG. 3 is a top view of a portion of a ship and a deckhouse on which are disposed a plurality of antenna;

FIG. 3A is a side view of the portion of the ship shown in FIG. 3;

FIG. 5A is a front isometric view of the antenna of FIG. 5;

FIG. 5B is a rear view of the antenna of FIG. 5;

FIG. 5C is an antenna cross-sectional view taken along lines 5C-5C in FIG. 5B;

FIG. 5D is an expanded view of an antenna portion taken along lines 5D-5D in FIG. 5C;

DETAILED DESCRIPTION OF THE PREFERRED EMBODIMENTS

Figure 1:
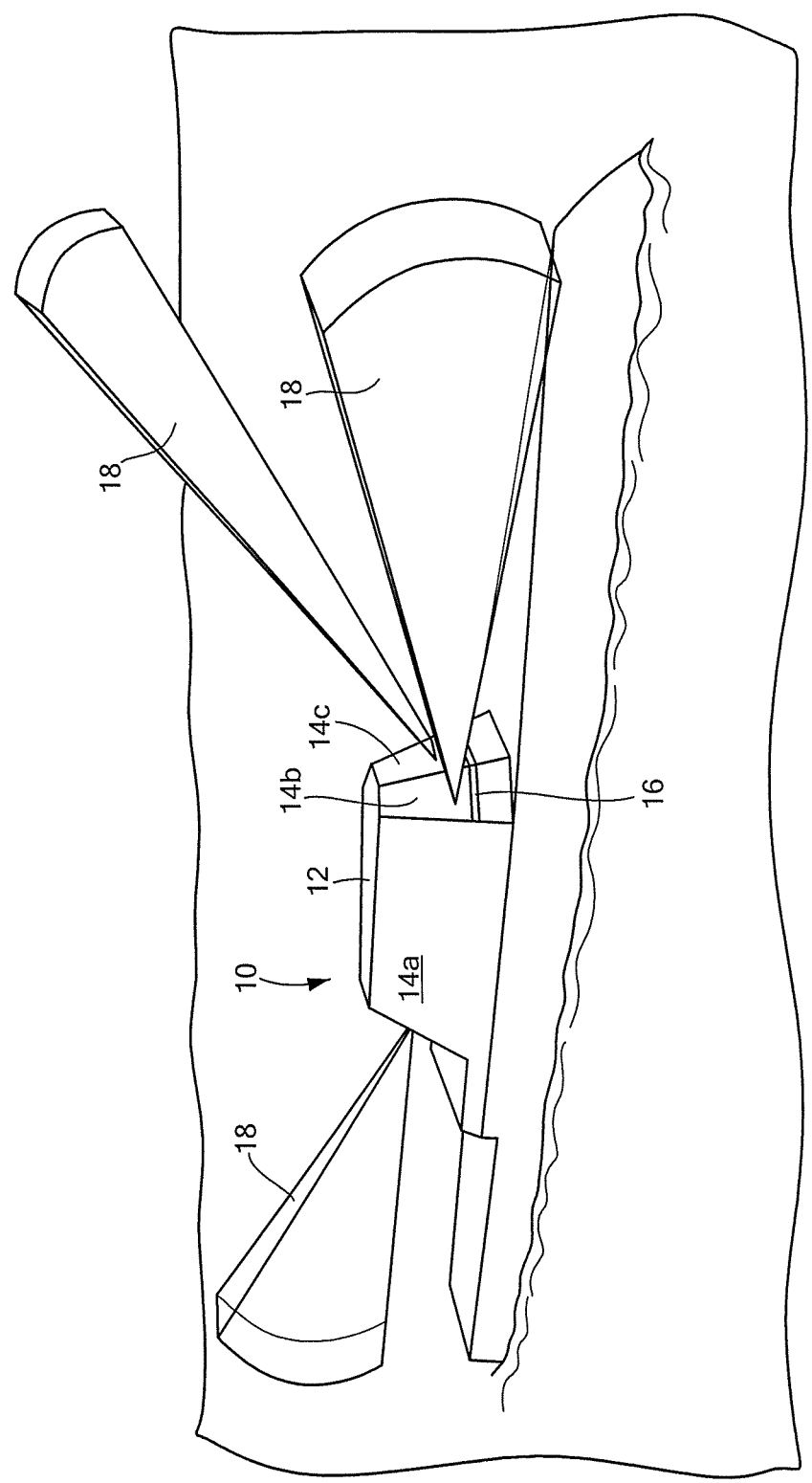
FIG. 1 is an isometric view of a ship having a deckhouse on which are disposed a plurality of antenna.

Before describing the details of a reliable and repeatable technique to perform an interior antenna boresight alignment, it should be appreciated that reference is sometimes made herein to the use of concepts, systems and techniques in the context of a particular environment (e.g. a ship and in particular antenna alignment from the interior of a ship deckhouse). Such references, however, are not intended as, and should not be construed as limiting. Rather such references are made solely to aid in providing clarity in the description of the concepts, systems and techniques describe herein.

Thus, described herein is an antenna alignment technique and related system are particularly appropriate for use when alignment must be done from a confined space such as an interior space of a structure on which the antenna is mounted. The alignment system and technique is also appropriate for use in an outdoor setting (i.e. the system and technique can be used in both indoor and outdoor settings). It should also be appreciated that the concepts, systems and techniques described herein apply to military as well as non-military structures such as military and non-military ships. It should, however, also be appreciated that the concepts, systems and techniques described herein also apply to antenna mounted on other mobile platforms such as military and nonmilitary military aircraft and ground based vehicles and platforms (not simply water-based vehicles and platforms). The concepts, systems and techniques described herein also apply to antenna mounted on fixed platforms (e.g. air traffic control towers and ocean deployed oil platforms).

As mentioned above, to promote clarity in the drawings and description of the concepts, systems and techniques described herein, the description is provided in the context of an electronically steerable array (ESA) shipboard alignment process for an identification friend or foe (IFF) ESA mounted on a ship deckhouse. In such a context, reference to a ship elevation plane refers to a master reference plane (MRP) for deckhouse only measurements or optical weapon control reference plane (OWCRP) for integrated ship measurements.

The IFF ESA assembly alignment process defines requirements to measure the orientation of the ESA with respect to a ship centerline plane (SCP) and elevation plane for port, starboard and aft deckhouse locations. Reference points defined by targets (e.g. optical targets) mounted on a portion of an antenna or an antenna frame or support structure (e.g. a so-called antenna back plate) are measured using a laser tracker to establish IFF ESA elevation, cross-elevation and azimuth angular orientation. The measured values are used to support combat system alignment and to electrically adjust the IFF ESA beam in azimuth.

This alignment process adjusts the ESA beam in the azimuth direction to within a desired amount of a nominal value with respect to a SCP.

Referring now to FIG. 1, a ship 10 includes a deckhouse 12 having a plurality of surfaces or faces 14a-14f (only faces 14a-14c are visible in FIG. 1) with each of the faces having one or more antenna 16 disposed thereon. Each antenna can transmit and/or receive signals via a respective antenna beam 18. One or all of the antenna 16 may be provided as phased array antenna and in particular as ESAs. To accurately locate and/or track targets with antenna beams 18, it is important that the position (e.g. orientation) of the antenna 16 (and thus antenna beams 18) relative to the ship coordinate system be known. This is because information gathered by the antenna 16 is shared among various systems (e.g. weapons systems) of the ship.

Figure 2:
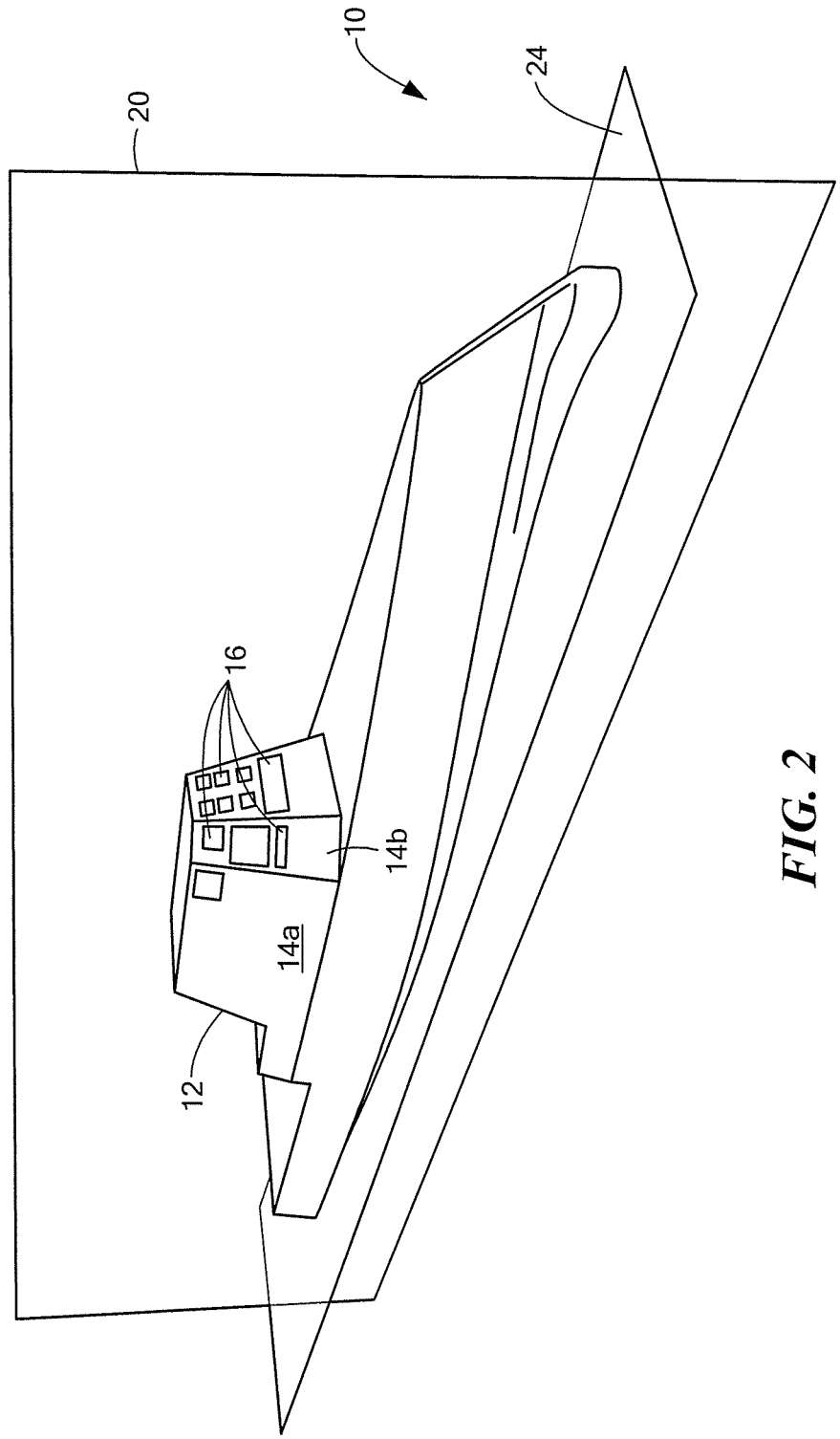
FIG. 2 is an isometric view of a ship having a plurality of reference planes projected thereon.

Referring now to FIG. 2 in which like elements of FIG. 1 are provided having like reference designations, as mentioned above, to ensure proper operation of antenna 16, each antenna must have a known alignment to the ship. As will become further apparent from the description herein below, this is accomplished by mathematically (e.g. via a processor or other processing device) constructing a ship centerline plane (SCP) 20 and a ship elevation plane (SEP) 24 to aid in antenna alignment. It should be noted that planes 20 and 24 (ship centerline plane and ship elevation plane, respectively) are all that are needed to perform alignment of an IFF antenna (see FIGS. 3, 3A). It should, of course, be appreciated that additional reference planes could be established if required by other devices for alignment.

Referring now to FIGS. 3 and 3A in which like elements are provided having like reference designations, a portion 32 of a ship, which may be the same as or similar to ship 10 described above in conjunction with FIGS. 1-2, includes a deckhouse 34 provided from walls projecting from a main body or hull 36. Deckhouse 34 has external surfaces 34a-34f. Antenna 38a, 38b, 38c, (generally denoted 38) are mounted or otherwise disposed on deckhouse 34 such that antenna faces 40a, 40b, 40c are exposed through respective external surfaces 34b, 34d, 34f of the deckhouse. As will become apparent from the description herein below in conjunction with FIG. 4, while front antenna face portions 40a, 40b, 40c are exposed through the external surfaces 34b, 34d, 34f of the walls which form deckhouse 34, the remaining portions of antenna 38 are visible and accessible through an interior portion or region of the deckhouse 34 (not visible in FIGS. 3, 3A). A ship coordinate system 41 is superimposed proximate ship portion 32.

Figure 4:
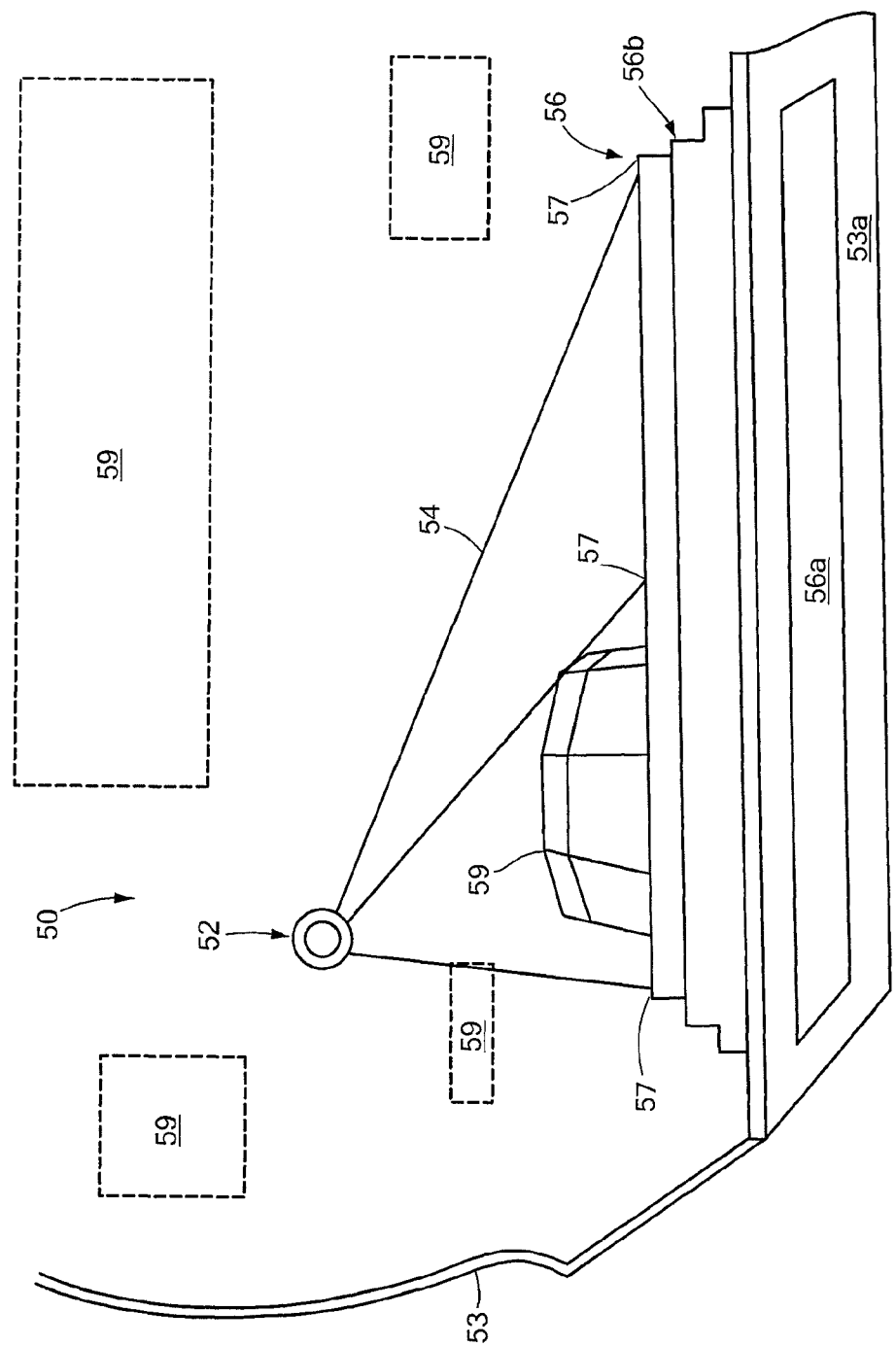
FIG. 4 is a top view of a laser tracker system disposed in an interior of a structure on which an antenna is disposed.

Referring now to FIG. 4, in accordance with the present concepts, systems and techniques described herein, an antenna boresight alignment system 50 includes a laser tracker 52 located inside a structure 53 on which an antenna 56 is mounted. Structure 53 may correspond, for example, to a ship deckhouse as shown in FIGS. 1-3A. Antenna face 56a is exposed through an external surface 53a of structure 53 and remaining portions of the antenna are disposed inside the structure 53 (i.e. in a space defined by the walls of structure 53). Portions of structure 53 have been removed from FIG. 4 to promote clarity in the figure and written description.

Antenna 56 has three (3) or more reference targets (or more simply "targets") 57 disposed on a rear surface 56b thereof. In one embodiment, targets 57 are provided as retro-reflective targets and the laser tracker 52 is a coordinate measurement machine (CMM) that measures 3D coordinates by tracking laser beams 54 to at least three of the retro-reflective targets 57 held in contact with the antenna 56. In the exemplary embodiment of FIG. 4, the laser tracker 52 is positioned internal to structure 53 (i.e. within an interior region of the structure 53) such that laser tracker 52 can measure points defined by the targets on the antenna and perform antenna boresight alignment between the antenna and the structure (or more appropriately, the platform) on which the antenna is mounted. Thus, laser tracker 52 must be positioned to avoid various objects 59 also disposed within the interior region of the structure 53.

Figure 5:
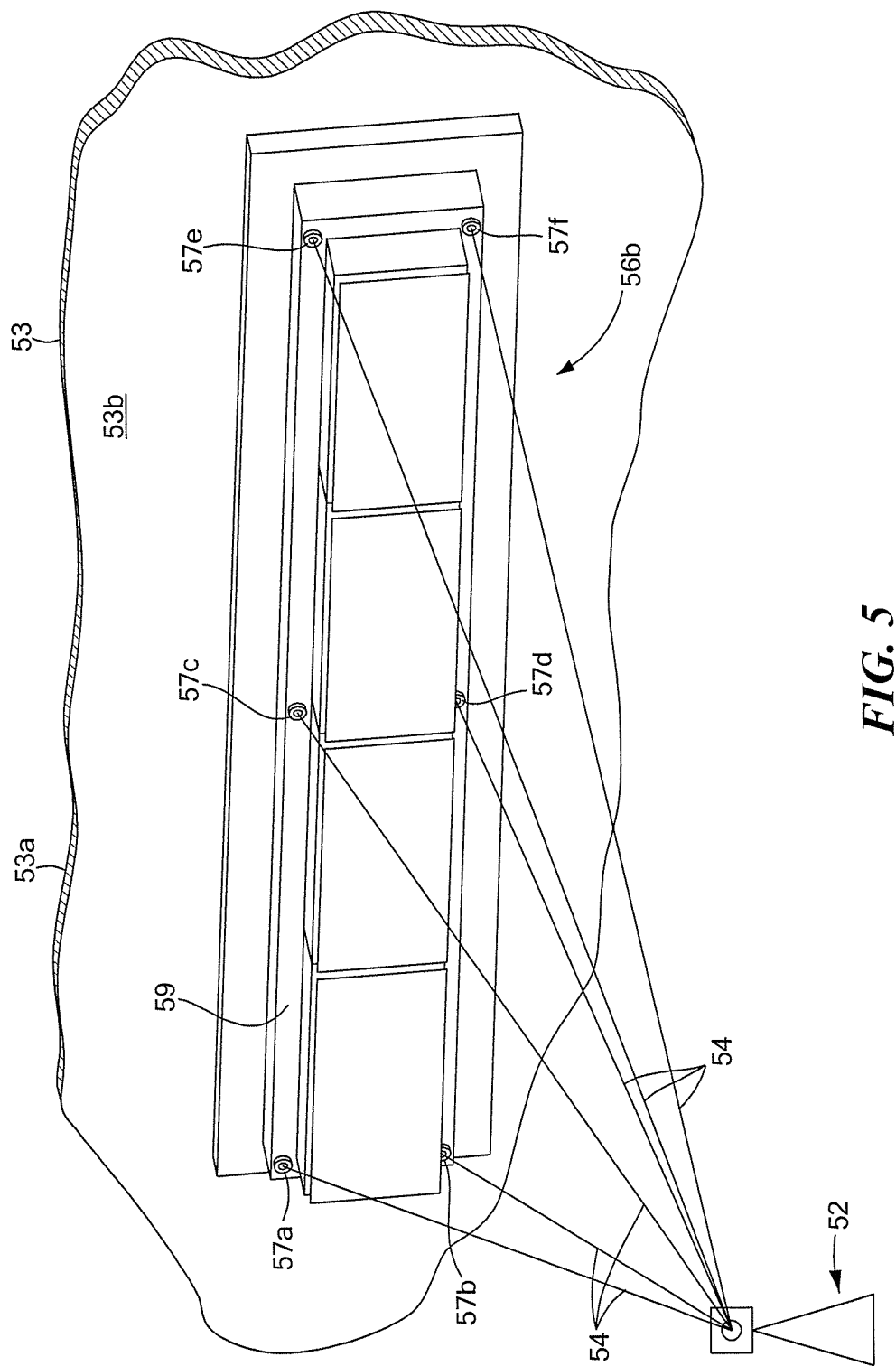
FIG. 5 is an isometric view of a laser tracker system and an antenna.

Referring now to FIG. 5, laser tracker system 52 projects a beam of light 54 at targets 57a-57f disposed on antenna 56. In the exemplary embodiment of FIG. 5, targets 57a-57f are disposed around a perimeter of an antenna frame 59. Antenna 56 may be of the type disposed on a surface of a deckhouse as shown in FIGS. 1-3A. Similarly, the laser tracker system may be of a type configured to be disposed in an interior of a ship or boat deckhouse or in some other confined space. In the embodiment of FIG. 5, the antenna 56 has six (6) reference targets 57 disposed thereon, but any number or targets three or greater may be used. Laser tracker system 52 emits light to illuminate each target. In one embodiment, laser tracker emits a single beam of light that is directed to at least three targets to measure three (3) points to establish a plane that defines the orientation of the antenna. As discussed above in conjunction with FIG. 4, at least three targets should be illuminated to allow proper antenna boresight alignment.

Referring now to FIGS. 5A-5D, in this exemplary embodiment, targets 57 include a base 60 (also sometimes referred to herein as a frame or mount) designed to hold a reflector 62. In one embodiment reflectors 62 are provided as spherically mounted retro reflectors (SMRs). In one particular embodiment, the reflectors 62 are provided as SMRs having a diameter of about 1.5 inch.

In one embodiment, base 60 is provided as a magnetic base which magnetically attaches to a portion of the antenna (or antenna frame). The base may also magnetically hold the reflector (e.g. SMR) in place when the base and reflector are placed in contact with each other. Reflectors having other shapes and/or sizes may, of course, also be used. With this particular arrangement, a system which allows a user to achieve a repeatable/stable measurement point every time a target location is measured is provided.

It should be appreciated that in the exemplary embodiment of FIG. 5, the targets 57 are magnetically coupled to a perimeter region of an ESA frame backplate 59. Thus, the measured points making up the reference plane are representative of the ESA frame (on which are mounted antenna radiating elements). The reference targets, may of course, also be mounted on other portions of the antenna.

Figure 6:
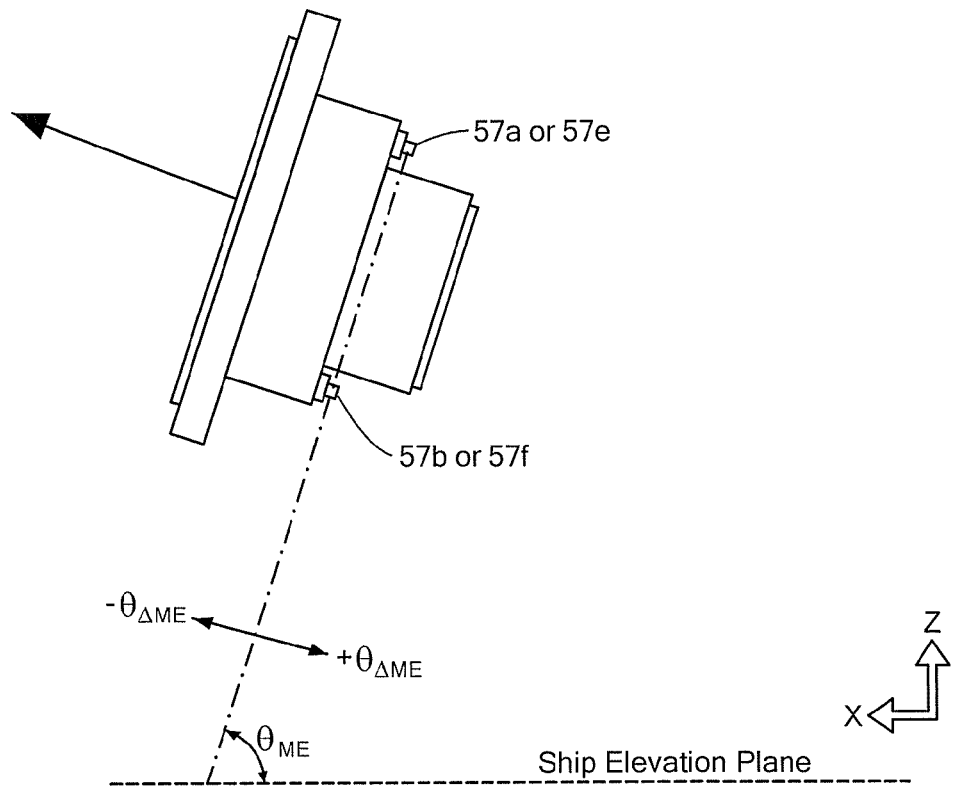
FIG. 6 is a side view of an antenna of the type which may be used on the ship deckhouse shown in FIGS. 1-3A and which illustrates an elevation angle measurement.
Figure 7:
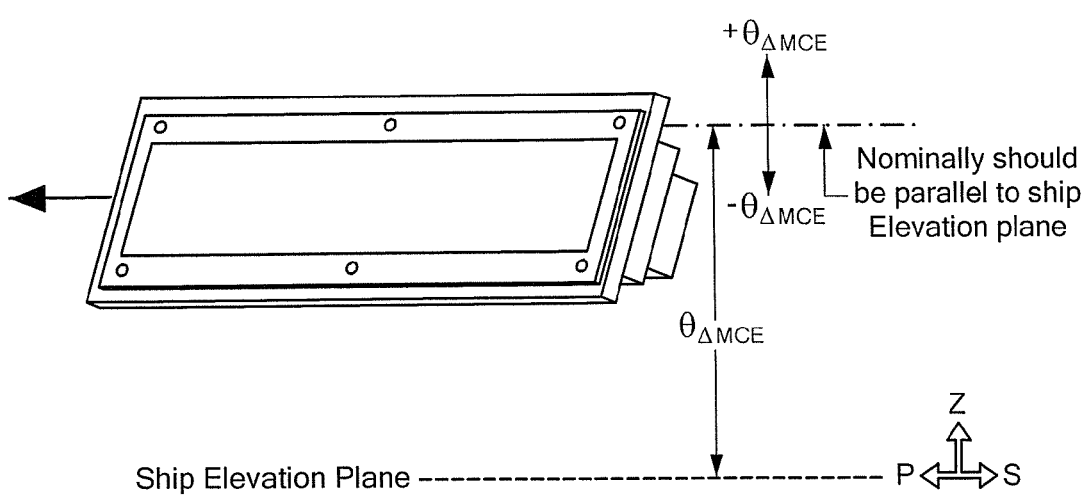
FIG. 7 is a front isometric view of the antenna in FIG. 6 and which illustrates a cross-elevation angle measurement.
Figure 8:
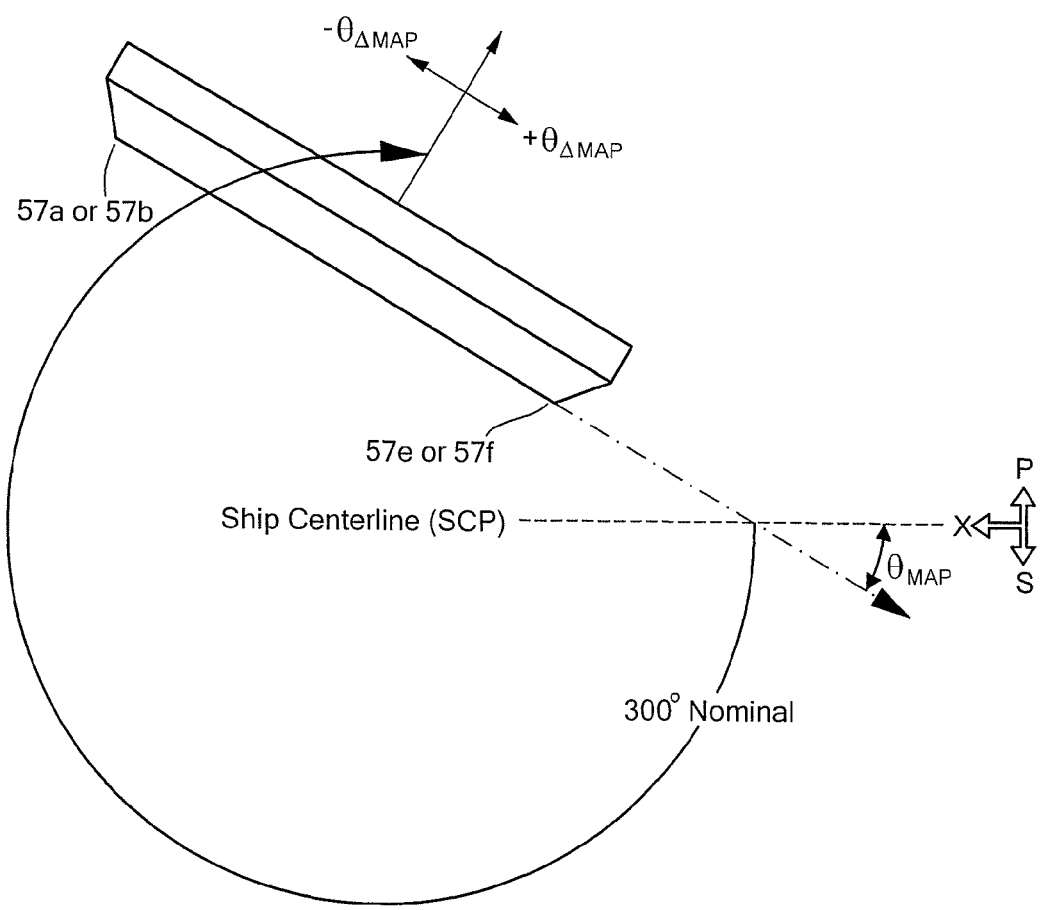
FIG. 8 is a view which illustrates an azimuth angle measurement.

FIGS. 6, 7 and 8 utilize the nomenclature listed in the below table.

TABLE

| Symbol | Description | Units |
|---|---|---|
| $\theta_{ME}$ | Measured Elevation Angle between ELEVATION_LINE and Ship Elevation Plane | Degrees |
| θΔME | Delta Measured Elevation Angle from Nominal | Degrees |
| $\theta_{MCE}$ | Measured Angle between CROSS_ELEVATION_LINE and Ship Elevation Plane | Degrees |
| θΔMCE | Delta Measured Cross Elevation Angle from Nominal | Degrees |
| θMA | Measured Angle between AZIMUTH_LINE and SCP | Degrees |
| $\theta_{MAS}$ | Starboard ESA: Measured Angle between AZIMUTH_LINE and SCP | Degrees |
| $\theta_{MAA}$ | Aft ESA: Measured Angle between AZIMUTH_LINE and SCP | Degrees |
| $\theta_{MAP}$ | Port ESA: Measured Angle between AZIMUTH_LINE and SCP | Degrees |
| $\theta_{\Delta MAS}$ | Starboard ESA: Delta Measured Azimuth Angle from ESA Nominal | Degrees |
| θΔMAA | Aft ESA: Delta Measured Azimuth Angle from ESA Nominal | Degrees |
| θΔMAP | Port ESA: Delta Measured Azimuth Angle from ESA Nominal | Degrees |
| $\theta_{NCB}$ | Non-Correctable Beam Azimuth Offset (from 4088112, Record Sheet 9) | Degrees |
| θBNS | Starboard ESA: Beam Position wrt Nominal | Degrees |
| θBNA | Aft ESA: Beam Position wrt Nominal | Degrees |
| θBNP | Port ESA: Beam Position wrt Nominal | Degrees |
| θNCAOS | Starboard ESA: Non-Correctable Azimuth Offset | Degrees |
| θNCAOA | Aft ESA | Degrees |

Referring now to FIGS. 6 and 7, a process for aligning a ship coordinate system and a coordinate system of a ship-mounted antenna is described. It should be noted that in those applications in which alignment of multiple antenna disposed on starboard, port and aft portions of a ship, the alignment procedure is the same for starboard, port and aft antenna mounting locations (e.g. 38a, 38b, 38c, respectively, in FIG. 3).

The process begins by first setting up the laser tracker system verifying that the laser tracker has a clear line of sight to a minimum of any three 3 of the reference targets designated 57a, 57b, 57e, 57f on the antenna to be aligned.

To determine an antenna (e.g. an ESA) elevation angle ($\theta_{ME}$) one constructs a line either from measured points 57a, 57b or measured points 57e, 57f and names the line ELEVATION_LINE. The measured points used to construct the line are recorded. Next, the angle between the ELEVATION_LINE and the ship elevation plane is then measured. The measured angle and delta from nominal are recorded.

To determine the ESA cross-elevation angle ($\theta_{MCE}$), construct a line either from measured points 57e to 57a (i.e. RT5 to RT1) or measured points 57f to 57b (i.e. RT6 to RT2) and name the line CROSS_ELEVATION_LINE. The measured points used to construct the line are recorded. Measure the angle between the CROSS_ELEVATION_LINE and the ship elevation plane. The measured angle and delta from nominal are recorded.

Referring now to FIG. 8, next described is an alignment process to determine an ESA azimuth angle and adjust beam position offset.

To determine ESA azimuth angle ($\theta_{MAS}$, $\theta_{MAA}$ & $\theta_{MAP}$), construct a line either from measured points 57a to 57e (i.e. RT1 to RT5) or measured points 57b to 57f (i.e. RT2 to RT6) and name the line AZIMUTH_LINE. The measured points used to construct the line are recorded. The angle between the AZIMUTH_LINE and the SCP is measured. The angle measured shall be recorded as a ship heading angle for the vector formed from measured points 57a to 57d (i.e. RT1 to RT5) or 57b to 57f (i.e. RT2 to RT6). The measured angle and delta measured azimuth angle from nominal are recorded.

Next described is the process used to adjust an antenna beam (e.g. an IFF ESA beam) in azimuth. It should be noted that one must account for the non-correctable azimuth offset found during alignment when the antenna is not mounted in the ship (e.g. antenna range alignment). First, the correct sign is applied to the offset (+) for CW and (−) for CCW. Using the delta measured azimuth angle from nominal and non-correctable beam azimuth offset angle, the ESA beam position is determined with respect to a nominal angle. If the ESA beam position with respect to the nominal angle is less than 0.1758° or greater than −0.1758° the value is recorded in a non-correctable azimuth offset record sheet and the ESA shipboard alignment process is complete. If the ESA Beam position with respect to nominal angle is greater than or equal to 0.1758° or less than or equal to −0.1758° the ESA beam must be adjusted. In one embodiment, the ESA beam is adjusted using an ESA beam steering controller (BSC).

Figure 9:
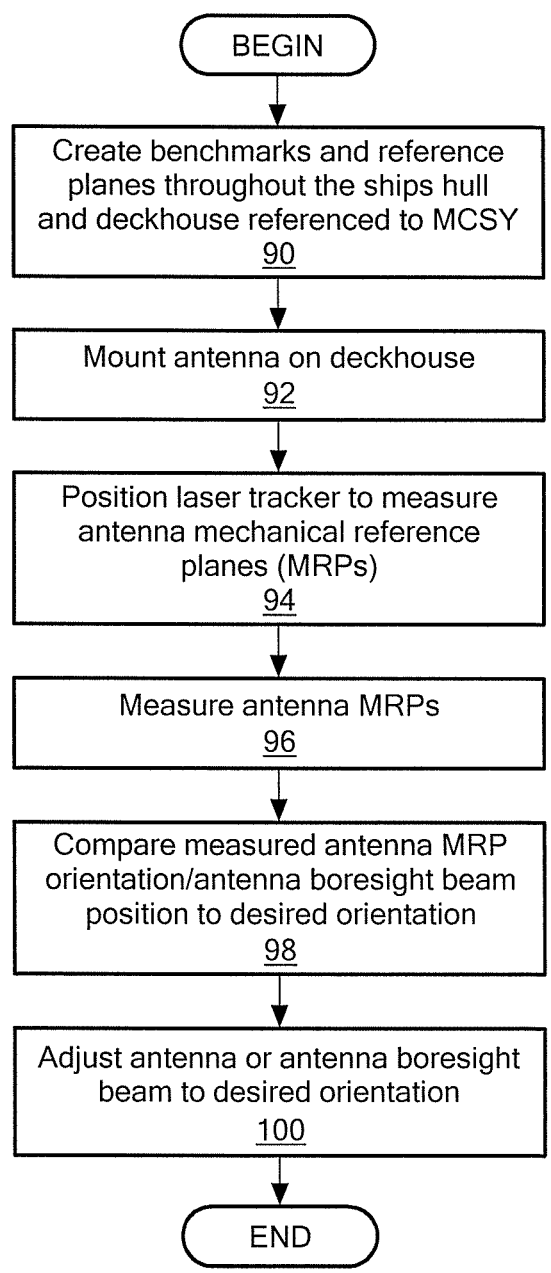
FIG. 9 is a flow diagram which illustrates a process for antenna boresight alignment.

Referring now to FIG. 9, a process for antenna alignment of a ship mounted antenna is shown. It should be appreciated that the alignment process may be affected by environmental factors (e.g. temperature) and that such factors may have to be taken into account during the alignment process.

The process begins in processing block 90 in which benchmarks and reference planes are created throughout a platform (e.g. a ship) and antenna support structure (e.g. deckhouse) is referenced to the master ship coordinate system (MCSY).

Next, as shown in processing blocks 92, 94 the antenna is mounted on the support structure (e.g. deckhouse) located on the platform (e.g. the ship) and the laser tracker system is mounted or otherwise positioned in a location having a clear line of sight to three or more reference targets on the antenna or on an antenna support structure (e.g. antenna back plate 59 described in conjunction with FIG. 59). The laser tracker is positioned to measure the antenna MRP.

As shown in processing block 96, the antenna mechanical reference planes (MRPs) are measured. It should be appreciated that prior to mounting the antenna to the ship (or other platform or structure on which the antenna will finally be mounted), the antenna MRP is measured with respect to the antenna boresight beam position. This measurement may be accomplished at an antenna range, for example. Thus, the AMRP is measured twice—once at an antenna range (or in some antenna measurement facility) and then again when the antenna is installed on the ship (or other platform or structure on which the antenna will finally be mounted).

In processing block 98, a comparison is made between the measured antenna MRP orientation/antenna boresight beam position and the desired orientation. Processing then proceeds to processing block 100 in which the antenna or antenna boresight is adjusted to a desired orientation. This adjustment can be made either mechanically or electronically. In one embodiment, an IFF antenna is adjusted using beam steering electronics (e.g. a beam steering controller).

Having described preferred embodiments which serve to illustrate various concepts, structures and techniques which are the subject of this patent, it will now become apparent to those of ordinary skill in the art that other embodiments incorporating these concepts, structures and techniques may be used. For example, the interior antenna alignment technique and related system described herein find use on military as well as non-military ships, as well as with antenna mounted on other mobile platforms such as military and nonmilitary military aircraft and ground based vehicles and platforms (not simply water-based vehicles and platforms as well as antenna mounted on fixed platforms (e.g. air traffic control towers and ocean deployed oil platforms). Accordingly, it is submitted that that scope of the patent should not be limited to the described embodiments but rather should be limited only by the spirit and scope of the following claims.

What is claimed is:

1. A system for aligning an antenna disposed through a wall of a deckhouse of a ship, the antenna having a front face exposed through an external surface of the deckhouse and a rear face exposed to and visible from an interior region of the deckhouse, the system comprising:
    a laser tracker system adapted to be mounted in the interior region of the deckhouse and configured to emit one or more laser beams; and
    three (3) or more reference targets, each of the reference targets adapted to be coupled to a corresponding number of different reference positions of the antenna, said reference targets disposed in a position which yields measurement points that represent a plane needed for alignment the antenna to first and second orthogonal ship planes.

2. The system of claim 1 wherein said laser tracker system constructs an azimuth line of the antenna using the reference targets and the system further compromises means for measuring an angle between the azimuth line and a ship centerline plane (SCP).

3. The system of claim 1 wherein said means for measuring an angle between the azimuth line and a ship centerline plane (SCP) is provided as part of said laser tracker system.

4. The system of claim 1 wherein each of said three or more reference targets are disposed on a rear surface of the antenna.

5. The system of claim 1 wherein the system comprises six reference targets each of said reference targets disposed on a rear surface of the antenna.

6. The system of claim 5 wherein each of said reference targets comprise a spherically mounted retro reflector.

7. The system of claim 6 wherein each of said reference targets comprise:
    a base coupled to the antenna; and
    a reflector removably coupled to the base.

8. The system of claim 7 wherein each of said reference targets comprises:
    a magnetic base removably coupled to the antenna; and
    a reflector magnetically coupled to said magnetic base.

9. The system of claim 8 wherein the reference targets are disposed along a perimeter of an antenna frame to which the antenna is coupled.

10. A method for aligning a mechanical reference plane of an antenna to a master coordinate system of a ship on which the antenna is mounted, the method comprising:
    (a) establishing benchmarks and at least two reference planes on the ship;
    (b) mounting the antenna on a mounting structure of the ship;
    (c) positioning a laser tracker to measure antenna mechanical reference planes (MRPs);
    (d) measuring antenna (MRPs);
    (e) comparing measured antenna mechanical reference plane orientations or antenna boresight beam position to a desired orientation and determining an adjustment value; and
    (f) in response to the comparing yielding a comparison value outside a range of threshold values, adjusting the antenna or antenna boresight beam to a desired orientation.

11. The method of claim 10 wherein positioning a laser tracker comprises positioning a laser tracker such that the laser tracker can point a laser beam at three or more reference targets coupled to the antenna.

12. The method of claim 11 wherein measuring antenna MRPs comprises emitting a laser beam at two or more different reference targets to establish a plane.

13. The method of claim 10 further comprising prior to mounting the antenna on the ship, measuring the antenna MRP with respect to antenna boresight beam position.

14. The method of claim 13 wherein measuring the antenna MRP with respect to antenna boresight position comprises using a laser tracker to measure antenna MRP with respect to antenna boresight position.

15. The method of claim 14 wherein adjusting the antenna boresight beam comprises electronically adjusting the antenna boresight beam via a beam steering controller.

16. The method of claim 15 wherein positioning the laser tracker comprises positioning the laser tracker such that laser beams point with a clear line of site to at least three different reference targets.

17. A system for aligning a coordinate system of an antenna to a coordinate system of a platform on which the antenna is disposed, the system comprising:
    a laser tracker system adapted to be positioned on the platform and configured to emit one or more laser beams; and
    three or more reference targets, each of the reference targets adapted to be coupled to a corresponding number of different reference positions of the antenna, said reference targets disposed in a position which yields measurement points that represent a plane needed for alignment of the antenna coordinate system to the coordinate system of the platform.

18. The system of claim 17 wherein in the platform comprises an interior region and the antenna is disposed on the platform such that a front face of the antenna is exposed through an external surface of the platform and a rear face of the antenna is exposed to and visible from the interior region of the platform, and wherein said a laser tracker system is positioned in the interior region of the platform with a clear line of sight to at least three of the three or more reference targets when they are coupled to the rear face of the antenna.

19. The system of claim 18 wherein each of said reference targets comprises:
   a magnetic base removably coupled to a portion of the antenna; and
   a reflector coupled to said magnetic base.

20. A method for aligning a mechanical reference plane of an antenna to a master coordinate system of a platform on which the antenna is mounted, the method comprising:
   (a) establishing benchmarks and at least two reference planes on the platform;
   (b) mounting the antenna on the platform;
   (c) positioning a laser tracker to measure antenna mechanical reference planes (MRPs);
   (d) measuring antenna (MRPs);
   (e) comparing measured antenna mechanical reference plane orientations or antenna boresight beam position to a desired orientation and determining an adjustment value; and
   (f) in response to the comparing yielding a comparison value outside a range of threshold values, adjusting the antenna or antenna boresight beam to a desired orientation.

21. The method of claim 20 wherein positioning a laser tracker comprises positioning a laser tracker such that the laser tracker can point a laser beam at three or more reference targets coupled to the antenna.

22. The method of claim 21 wherein measuring antenna MRPs comprises emitting a laser beam at two or more different reference targets to establish a plane.

23. The method of claim 22 further comprising prior to mounting the antenna on the platform, measuring the antenna MRP with respect to antenna boresight beam position using a laser tracker and at least three of the at least three reference targets.

* * * * *